UNITED STATES PATENT OFFICE.

LOUIS J. CRECELIUS, OF ST. LOUIS, MISSOURI.

PROCESS OF TREATING THE SURFACE OF METALS.

No. 831,937.      Specification of Letters Patent.      Patented Sept. 25, 1906.

Application filed September 28, 1905. Serial No. 280,528.

*To all whom it may concern:*

Be it known that I, LOUIS J. CRECELIUS, a citizen of the United States, residing at the city of St. Louis and State of Missouri, have invented a new and useful Improvement in the Processes of Treating the Surface of Metals, of which the following is a specification.

My invention relates to the process of treating the surface of metal, and especially molds for glassware and molds into which metals are cast.

Molds when under a heat of 900° or more scale very rapidly, and the articles formed, blown, pressed, or cast into them stick and soon produce a defective article, especially in the manufacture of glassware. This is so serious a difficulty in the latter industry that the scaling has to be removed as soon as it makes its appearance, resulting after a few such removals in changing the size and configurations of the mold and finally entirely destroying its usefulness. By my method, hereinafter fully described, I give the surface of the metal a treatment which prevents this destructive action and gives the object treated a smooth working face free from scaling and other defects.

Having thus given a general description of my invention and stated its objects, I shall describe the process in detail. First, on the finished surface of the article being treated—for example, the working surface of a mold—I apply some chemical having a cleansing effect. I have found hydrofluoric acid to be well adapted to this purpose. This has the effect of removing the sand and other impurities from the pores of the metal. I next put a combination of some material of a high fusibility, (carbon, for instance,) mixed with a suitable filler, on the parts just cleansed. I then place the article being treated into a muffled furnace, where it is heated sufficiently to expand the metal closely to its full limit, or hotter than the mold (or other treated object) will get in actual use, (say about 1800° Fahrenheit,) in order that the materials applied as above described will embed themselves into the expanded pores of the mold. I then remove the article being treated from the furnace and allow it to cool slowly, after which I polish from its working surface the surplus material collected thereon, leaving only such part as has embedded itself into the pores of the metal and made itself a part of its surface.

I am aware that prior to my discovery there existed the art of enameling—that is, chemically cleansing an object, coating it with an enameling material or paint, and baking the same in a muffled furnace. I do not claim such a process. My process not only attains entirely different objects, but is readily distinguished from it by the above description. The materials employed are different. By my process the object is heated to a much higher degree of heat, and I remove the material not embedded in the pores of the treated object, a step of course not taken in the enameling process.

What I claim, and desire to secure by Letters Patent, is—

The process of treating the surface of metals, which process consists in first giving the said surface an acid-bath to remove the impurities from the metal, next covering it with refractory materials largely composed of carbon, then heating the article under treatment in a furnace until the pores of the article are expanded closely to their limit, next removing the object from the furnace, and finally polishing from the surface all surplus material.

In testimony whereof I have signed my name to this specification in the presence of two subscribing witnesses.

LOUIS J. CRECELIUS.

Witnesses:
     E. J. MEDILL,
     D. H. DONOVAN, Jr.